No. 821,272. PATENTED MAY 22, 1906.
H. J. WIEGAND.
HAND WHEEL.
APPLICATION FILED FEB. 21, 1903. RENEWED MAR. 7, 1906.

Witnesses:
M. R. Rochford.
Edwin A. H. Tower, Jr.

Inventor
Henry J. Wiegand
By Jones & Addington
Attys.

UNITED STATES PATENT OFFICE.

HENRY J. WIEGAND, OF MILWAUKEE, WISCONSIN, ASSIGNOR TO THE CUTLER-HAMMER MFG. CO., OF MILWAUKEE, WISCONSIN, A CORPORATION OF WISCONSIN.

HAND-WHEEL.

No. 821,272.  Specification of Letters Patent.  Patented May 22, 1906.

Application filed February 21, 1903. Renewed March 7, 1906. Serial No. 304,777.

*To all whom it may concern:*

Be it known that I, HENRY J. WIEGAND, a citizen of the United States, residing at Milwaukee, in the county of Milwaukee and State of Wisconsin, have invented a certain new and useful Improvement in Hand-Wheels, of which the following is a full, clear, concise, and exact description, reference being had to the accompanying drawings, forming a part of this specification.

My invention relates to improvements in hand-wheels.

It is the object of this invention to produce a hand-wheel having a rim and spider of stamped metal.

The device which I have designed has a general appearance equal to that of a wheel made of cast metal and may be constructed at a much less cost. Moreover, the manner in which the stamped metal parts of my device are formed produces a structure which in the use for which it is intended is as strong as a wheel made from cast metal.

The device as constructed in its preferred form consists of the details of construction, arrangement, and combination of parts, as hereinafter described, and particularly pointed out in the claims.

Figure 1:
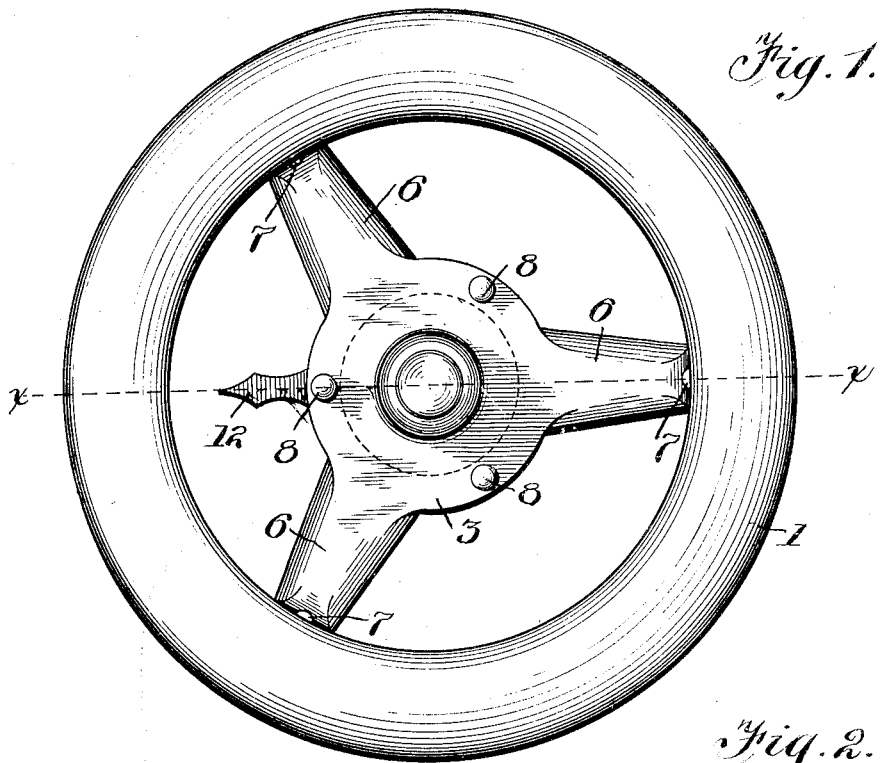
Figure 2:
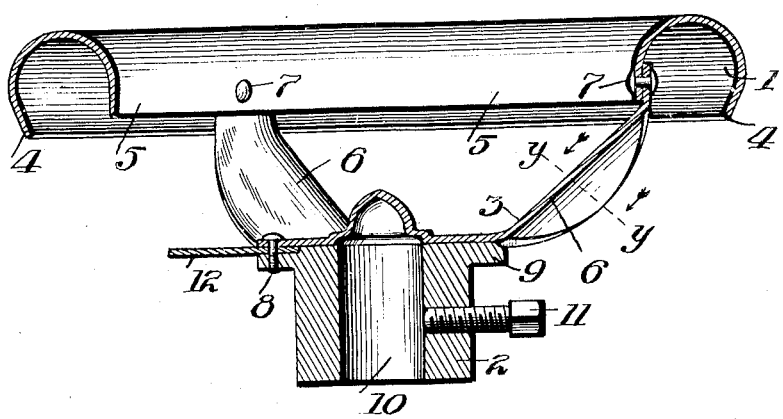
Figure 3:

In the drawings forming a part of this application, Figure 1 is a hand-wheel made in accordance with the preferred embodiment of my invention. Fig. 2 is a sectional view on the line $x$ $x$ of Fig. 1, and Fig. 3 is a sectional view taken through one of the arms of the spider on the line $y$ $y$ of Fig. 2.

Referring to the drawings, which show one way of carrying out my invention, therein is shown a wheel which has a rim 1, supported upon a hub 2 by a spider 3. In describing the wheel the rim will be considered as at the front thereof and the hub at the rear. The rim 1 consists of a stamped circular plate or ring which has its outer and inner edges 4 and 5, respectively, bent back to curve the plate transversely. By "curved transversely" it will be understood that said plate and the other parts of the wheel when so described are curved in cross-section. The outer edge 4 preferably extends slightly farther back from the face of the wheel than the inner edge 5 in order to hide said inner edge. The transverse curvature of the rim gives to the rim when viewed from the front and sides an appearance as though it were made of solid metal instead of a stamped plate.

The spider 3, which supports the rim upon the hub, is also formed from stamped metal and has preferably radial arms 6, which are preferably integrally connected at their center and are secured at their outer ends to the rim. The arms preferably incline rearwardly from the rim of the wheel to their integral connection in order to set the hub 2, to which the spider is attached, back from the rim. By securing the spider in position upon the hub, as shown, the central portion of the spider effectually covers the opening 10 in the hub and prevents accumulation of dirt and grease therein. The outer ends of the arms are bent to extend in between the edges of the plate constituting the rim and are secured to the inner edge by rivets 7, passing through coincident apertures in the outer ends of said arms and the edge of said rim. The portions of the arms between their integral connection and the rim are preferably curved back transversely, as shown, to strengthen the arms and to give the same a neater and better appearance. The spider for the wheel as thus constructed is preferably secured to the hub 2, of cast metal, by rivets 8, which pass through holes in the integral connection between the arms of said spider and a lateral annular flange 9 upon the periphery of said hub. The hub is provided with a socket or hole 10 for the reception of a shaft, on which it may be held against turning by a screw 11, threaded in a hole in said hub transverse to the shaft. Where it is desired to use this hand-wheel for rheostats, a pointer 12 is preferably secured to the hub. The end of the pointer is preferably seated in a recess in the face of the hub, on which is secured the spider, and held in position by one of the rivets which secure the spider to the hub. Of course this pointer might be stamped integral with the hub, if preferred.

A hand-wheel made in accordance with my invention may be constructed at a much less cost than one made from cast metal. When viewed from the front, the wheel has the appearance of a cast-metal wheel, owing to the manner in which the parts are constructed. In addition to improving the appearance the construction of the parts gives the wheel sufficient strength to permit it to be used in all places where the hand-wheel of cast metal is now employed.

It is manifest that the broad invention which it is aimed to cover by this application may take many forms and be applied to various uses, only one of which has been herein described and shown. Where it is feasible, the spider may be secured directly to the device which it is desired to operate without the hub, and if it should be deemed desirable the arms might be connected at the center in other ways than by the integral portion. Furthermore, the spider and rim might be made in other forms than that set forth and yet obtain the results which I have designed my invention to accomplish, and the way in which the parts may be attached to each other can be suited to the circumstances. Therefore I reserve the right to make such changes and modifications as fairly fall within the scope of my invention.

Having described my invention, what I claim as new, and desire to secure by Letters Patent, is—

1. In a hand-wheel, the combination with an annular, substantially semicylindrical sheet-metal rim, of a spider for supporting said rim in position.

2. In a hand-wheel, the combination with an annular, substantially semicylindrical sheet-metal rim formed from a single piece of material, of a spider for supporting said rim in position.

3. In a hand-wheel, the combination with an annular, substantially semicylindrical sheet-metal rim, of a spider formed from sheet metal for supporting the same in position.

4. In a hand-wheel, the combination with an annular, substantially semicylindrical sheet-metal rim formed from a single piece of material, of a sheet-metal spider formed from a single piece of material for supporting said rim in position.

5. In a hand-wheel, the combination with an annular, substantially semicylindrical sheet-metal rim, of a spider formed from sheet metal and having the outer ends of its arms attached to the under side of said rim for supporting the rim in position.

6. In a hand-wheel, the combination with an annular, substantially semicylindrical sheet-metal rim, of a spider formed from sheet metal having the arms thereof curved transversely and inclined rearwardly from the rim for supporting the same.

7. In a hand-wheel, the combination with an annular substantially semicylindrical sheet-metal rim, of radial arms for supporting the same.

8. In a hand-wheel, the combination with an annular substantially semicylindrical sheet-metal rim, of radial sheet-metal arms for supporting the same.

9. In a hand-wheel, the combination with an annular substantially semicylindrical sheet-metal rim, of radial transversely-curved sheet-metal arms for supporting the same.

10. A hand-wheel comprising a rim adapted to be grasped by the hand of the operator and consisting of a circular sheet-metal transversely-curved plate, and a spider formed from sheet metal having the arms thereof attached to the inner face of the inside edge of said rim, substantially as described.

11. A hand-wheel comprising a hub, a spider formed from sheet metal mounted upon said hub and forming a cover for the opening therein, and a rim adapted to be grasped by the hand of the operator and consisting of a circular sheet-metal transversely-curved plate having its inner edge secured to the inner surface of said spider and its outer edge extended slightly farther beyond the face of the wheel than its inner edge, substantially as described.

In witness whereof I have hereunto subscribed my name in the presence of two witnesses.

HENRY J. WIEGAND.

Witnesses:
A. BARROWS,
F. P. SECHRIST.